Sept. 23, 1947.                    W. E. STINSON ET AL                    2,427,980
                                  AIRCRAFT CONTROL SURFACE
                                    Filed Oct. 22, 1943
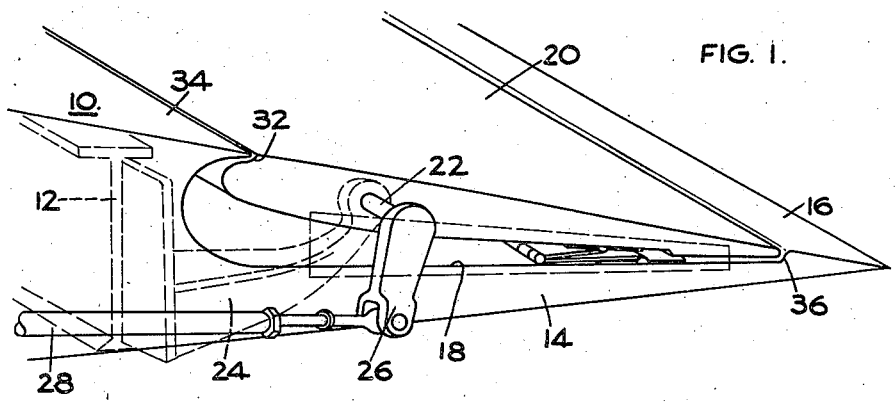
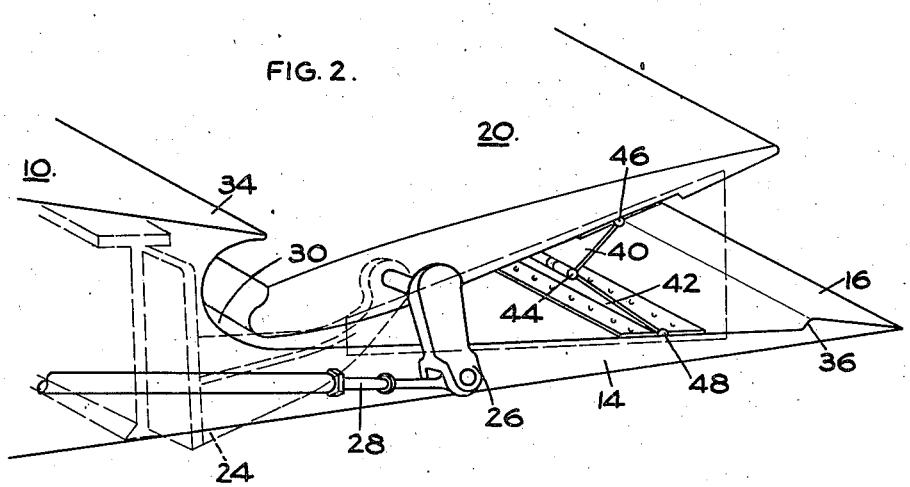
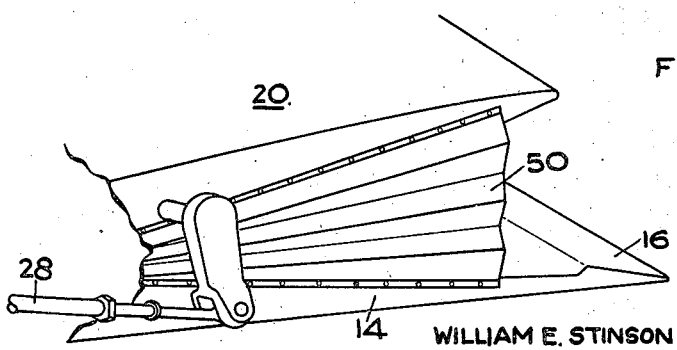
INVENTOR
WILLIAM E. STINSON AND F. SPENCELEY
BY
Beau Brooks, Buckley & Beau,
ATTORNEYS Patented Sept. 23, 1947

2,427,980

UNITED STATES PATENT OFFICE 2,427,980

AIRCRAFT CONTROL SURFACE

William E. Stinson, North Tonawanda, and Frederick Spenceley, Niagara Falls, N. Y., assignors to Bell Aircraft Corporation, Buffalo, N. Y.

Application October 22, 1943, Serial No. 507,280

3 Claims. (Cl. 244—42)

This invention relates to aircraft, and more particularly to improvements in airplane flight control surfaces such as of the so-called split trailing edge type, spoilers; or any other arrangement for the purpose of altering the lift characteristics of an airfoil.

One of the objects of the invention is to provide an improved split trailing edge type control surface which embodies elements which are automatically operable to assist the control actuating means in opening the movable surface thereof into the airstream relative to the airplane, thereby reducing the operating loads upon the surface control mechanism. Another object of the invention is to provide an improved control surface device having the features and advantages above referred to, and which is of structurally simple and rugged and otherwise improved form. Another object of the invention is to provide the above stated objects and advantages without employment of additions and complications to the usual control mechanism therefor. Other objects and advantages of the invention will appear in the specification hereinafter.

In the drawings:

Fig. 1 is a fragmentary end view of an airplane wing panel of the split trailing edge type embodying the invention; the movable control surface portion thereof being illustrated in its closed position;

Fig. 2 is a view corresponding to Fig. 1, but showing the movable control surface portion in open position; and Fig. 3 is a fragmentary view corresponding to Fig. 2 and showing an end cover device installed thereon.

The invention is illustrated in connection with an airplane wing panel which is illustrated generally to comprise a typical wing structure 10 fabricated around a spar member 12. The wing panel is of the trailing edge split type. That is, it comprises a positionally fixed body portion 14 throughout the entire chordwise extent of the wing panel and terminating in the usual trailing edge portion 16; and a movable control surface or flap in association therewith. The upper portion of the wing panel ahead of the extreme trailing edge section 16 is cut away as indicated at 18 to provide a space to be partially occupied by the flap which is designated 20 and is pivoted relative to the positionally fixed wing structure by means of spanwise extending and aligned hinge pin or shaft devices as indicated at 22. The pins 22 are carried by brackets 24 extending from the spar 12 at suitable intervals in the spanwise direction of the wing panel.

The upper surface of the flap 20 is contoured so as to cooperate with adjacent upper surface portions of the fixed wing structure to provide altogether, when the flap 20 is in closed position, as shown in Fig. 1, a smoothly continuous wing panel of typical airfoil shape, whereby to provide a completely streamlined wing panel for optimum aerodynamic performance. The hinge axis of the pins 22 is disposed rearwardly of the nose portion of the flap 20, and a horn 26 is keyed to a shaft portion 22 and pivotally connected to a push-pull control device 28. Hence, the control device 28 is adapted to be pilot manipulated to cause the flap 20 to pivot about the axis of the shaft 22, between the flap-closed position of Fig. 1 and flap-open positions as shown in Figs. 2-3.

The recessed portion 18 of the stationary wing structure is sufficiently recessed in the region of the movement of the nose portion of the flap 20 to enable the latter to move downwardly into the body of the wing structure upon opening movement of the flap as shown in Fig. 2, and to thereby draw away from the fixed wing structure to provide therebetween a curved slot or air passageway as indicated at 30 which leads downwardly around the nose of the flap 20 and thereunder. As shown in Fig. 1, the extreme nose portion of the flap 20 is shaped as indicated at 32 so as to be adapted to seat in slot-closing position relative to an overhanging rear edge portion 34 of the top surface of the fixed wing structure, when the flap 20 is in its closed position. Also, the trailing edge portion 16 of the wing panel is preferably notched as indicated at 36 so as to be adapted to receive the extreme trailing edge portion of the flap 20 in smoothly seated position therein, when the flap 20 is in closed position; thereby providing the smooth closed airfoil shape referred to hereinabove.

Thus, it will be understood that upon pivotal movements of the flap 20, as from its closed position in Fig. 1 to an open position as shown in Fig. 2, the flap portion aft of the hinge axis of the shaft 22 will thereupon project upwardly into the airstream externally of the aircraft for airplane control purposes, as is well known in the art. It will also be understood that such movement of the control flap 20 into an open position introduces relative airstream pressure forces thereagainst such as tend to press the flap downwardly toward its closed position; and that under high speed flight conditions the turning moments resulting from such pressure forces are of great magnitude in the case of conventional flap arrangements. Whereas, it is customary to combat such airstream forces by providing for correspondingly increased control forces in the flap actuating system, the present invention contemplates diversion of a portion of the airstream pressure forces from externally of the control flap 20 to a position interiorly of the wing panel in such manner that the pressure forces thereof are enabled to operate automatically in opposition to the externally imposed airstream forces, thereby reducing the loads upon the flap control system and/or the pilot. To accomplish the above stated object the invention contemplates provision of an extensible-retractable wall means linking the fixed wing structure and the pivotable flap at a position rearwardly of the flap hinge axis and spanning the space therebetween under all conditions of flap adjustment, whereby the interiorly directed airstream forces referred to hereinabove will be entrapped between the fixed wing structure and the flap so as to press against the flap 20 from interiorly thereof in such manner as to provide a turning moment about the flap hinge axis in opposition to the external airstream forces.

As illustrated in the drawing, the air-trap wall device of the invention may comprise a hinge! like device including a pair of wall plates 40—42 which are connected in articulated relation by means of a pintle pin 44, to provide in effect a single wall structure which is foldable about the axis of the pintle pin 44. At its respective upper and lower edges, the foldable wall structure is pivotally fixed to the flap 20 and to the lower fixed wing structure 14, as by pintle pins 46—48, respectively; the hinge axes of the pintle pins 44—46—48 being all arranged to extend spanwise of the wing panel and parallel to the flap axis 22. The folding wall structure is so arranged that when it is in folded condition as shown in Fig. 1, the central pin carrying portion thereof is disposed forwardly of the positions of the pintle pins 46—48; and it will be understood that upon opening of the flap 20 the position of the pintle pin 44 will move rearwardly while the folding wall structure opens to continue to block the space between the flap and the fixed wing structure under all conditions of flap adjustment to provide a pressure accumulation chamber interiorly of the wing behind the position of the hinge axis 22.

Consequently, upon actuation of the control member 28 in such manner as to pivot the rear portion of the flap 20 outwardly into the relative airstream, a portion of the airstream will be "backed-up" and diverted downwardly into the slot 30 leading around the nose of the flap and into the pressure chamber ahead of the wall plates 40—42, whereby pressure forces will be developed interiorly of the wing to act against the flap 20 in such manner as to assist the control member 28 in moving the flap 20 toward further opened positions. As the flap 20 moves to further opened positions, the air pressure forces interiorly of the wing become increasingly effective against the inner surfaces of the wall plates 40—42, whereby to press the latter rearwardly and to thereby tend to cause the wall structure to unfold and as a consequence thereof develop additional forces tending to spread the fixed wing and movable flap structure.

Thus, the mechanical advantage of the pressure forces acting upon the folding wall 40—42 increases as the flap 20 moves further into the relative airstream, and it will be understood that in this manner any desired portion of the hinge moment due to external pressure forces may be counterbalanced, and that these counterbalancing effects may be regulated as desired by varying the construction and the relative proportions of the internal pressure developing parts of the mechanism. Preferably, in order to further facilitate operation of the pressure accumulation device of the invention, the end portions of the wing structure will be air-sealed. For example, as illustrated at 50 in Fig. 3, the end portions of the wing device may be enclosed by flexible cover or bellows devices, or the like; such as will contract and expand automatically in conjunction with opening and closing movements of the flap 20, thereby preventing undesirable escape of pressured air from interiorly of the wing structure. If desired in any given instance, however, arrangement may be made to permit some limited degree of leakage of air through the air blocking wall device, and the amount of such leakage may be regulated so as to obtain any desired degree of counterbalancing of the external air pressure forces throughout various phases of the flap movement.

It will be understood that although the invention has been illustrated only in connection with the so-called upper aileron type wing, it may be employed with equal facility in connection with lower flap arrangements and/or combinations thereof such as are adapted for use as diving brakes, or spoilers, or any other arrangement for the purpose of altering the lift characteristics of an airfoil. It will also be understood that although only one form of extensible-contractable air-trapping wall device has been shown and described in detail other forms thereof may be employed; and that other changes may be made in the mechanism illustrating application of the invention without departing from the spirit of the invention and the scope of the appended claims.

What is claimed is:

1. In an aircraft, a split trailing edge type airfoil comprising a stationary airfoil surface and a movable airfoil surface adapted to lie in continuous general contour forming juxtaposition to provide in effect a single streamlined airfoil structure, a pivot device carried by said stationary surface and connected to said movable surface rearwardly of the leading edge thereof whereby said movable surface is pivotally movable relative to said stationary surface to provide split trailing edge effects, pilot-operable means for moving said movable airfoil surface toward and away from trailing edge split positions, a wall device comprising a pair of plates, a hinge device articulating adjacent edges of said plates, bearing devices pivotally connecting the opposite edges of said plates respectively with said surfaces whereby said plates are arranged to span the space between said surfaces under all conditions of movable surface adjustment whereby to block passage of air between said surfaces under trailing edge split conditions, said plates being so arranged that the position of said hinge device is closer than said bearing devices to said pivot device, said movable airfoil surface being so shaped and said pivot device being so arranged that the leading edge of said movable surface moves inwardly away from the general contour of said airfoil to provide an air slot between said surfaces whenever said movable surface is pivoted to trailing edge split position whereby to provide an air gap therebetween so that a portion of the relative airstream pressure forces will be introduced into the space between said surfaces whenever said movable surface is moved toward trailing edge split position to direct air pressure forces against said wall device so as to operate said plates in the manner of levers to assist in moving said movable surface toward further split positions.

2. In an aircraft, a split trailing edge type airfoil comprising a stationary airfoil surface and a movable airfoil surface adapted to lie in continuous general contour forming juxtaposition with said stationary surface to provide in effect a single streamlined airfoil structure, a pivot device carried by said stationary surface and connected to said movable surface whereby said movable surface is pivotally movable relative to said stationary surface to provide split trailing edge effects, pilot-operable means for moving said movable airfoil surface toward and away from trailing edge split positions, a wall device comprising hingedly inter-connected plates, bearing devices pivotally connecting the opposite edges of said plates respectively with said surfaces whereby said plates are arranged to span the space between said surfaces under all conditions of movable surface adjustment whereby to block passage of air between said surfaces under trailing edge split conditions, said movable airfoil surface being so shaped and said pivot device being so arranged that the leading edge of said movable surface moves inwardly away from the general contour of said airfoil to provide an air slot leading from externally of the airfoil into the space between said surfaces whenever said movable surface is pivoted to trailing edge split position.

3. In an aircraft, a split trailing edge type airfoil comprising a recessed stationary airfoil surface and a movable airfoil surface adapted to lie in the recessed portion of the stationary surface in continuous general contour forming juxtaposition therewith to provide in effect a single streamlined airfoil structure, a pivot device carried by said stationary surface and connected to said movable surface whereby said movable surface is pivotally movable relative to said stationary surface to provide split trailing edge effects, a wall device comprising hingedly inter-connected rigid plates, bearing devices pivotally connecting opposite plate edges respectively with said surfaces whereby said plates are arranged to span the space between said surfaces under all conditions of movable surface adjustment, said movable airfoil surface being so shaped and said pivot device being so arranged that the leading edge of said movable surface moves inwardly away from the general contour of said airfoil to provide an air slot leading from externally of the airfoil between said surfaces whenever said movable surface is pivoted to trailing edge split position.

WILLIAM E. STINSON.
FREDERICK SPENCELEY.

REFERENCES CITED

The following references are of record in the file of this patent:

UNITED STATES PATENTS

| Number | Name | Date |
|---|---|---|
| 2,011,902 | Leigh | Aug. 20, 1935 |
| 2,254,304 | Miller | Sept. 2, 1941 |
| 2,369,152 | Lowell et al. | Feb. 13, 1945 |

FOREIGN PATENTS

| Number | Country | Date |
|---|---|---|
| 430,941 | Great Britain | June 27, 1935 |